(12) United States Patent
Byrne et al.

(10) Patent No.: US 7,712,097 B2
(45) Date of Patent: May 4, 2010

(54) DATA PROCESSING SYSTEM TO INITIALIZE OR MODIFY THE SYSTEM TO PERFORM TRANSACTIONS USING MASK COMPRISES ON/OFF FLAGS

(75) Inventors: John Byrne, Dublin (IE); Elaine Mcilhagga, Dublin (IE); Grace O'Donnell, Dublin (IE)

(73) Assignee: Information Mosaic Limited, Dublin (IE)

( * ) Notice: Subject to any disclaimer, the term of this patent is extended or adjusted under 35 U.S.C. 154(b) by 1446 days.

(21) Appl. No.: 11/037,331

(22) Filed: Jan. 19, 2005

(65) Prior Publication Data

US 2005/0132377 A1 Jun. 16, 2005

Related U.S. Application Data

(63) Continuation of application No. PCT/IE03/00105, filed on Jul. 23, 2003.

(30) Foreign Application Priority Data

Jul. 24, 2002 (IE) .................................. 2002/0612

(51) Int. Cl.
*G06F 9/46* (2006.01)
*G06F 7/00* (2006.01)
*G06F 17/00* (2006.01)

(52) U.S. Cl. .................. 718/101; 718/108; 707/103 Y; 707/102

(58) Field of Classification Search .................. 718/101, 718/106, 108; 707/102, 103 Y
See application file for complete search history.

(56) References Cited

U.S. PATENT DOCUMENTS

| 4,658,351 | A  | * | 4/1987  | Teng .......................... 718/103 |
| 6,205,468 | B1 | * | 3/2001  | Diepstraten et al. ......... 718/108 |
| 6,233,587 | B1 | * | 5/2001  | Tandon .................... 707/103 R |
| 6,256,637 | B1 | * | 7/2001  | Venkatesh et al. ........ 707/103 Y |
| 6,317,748 | B1 | * | 11/2001 | Menzies et al. .......... 707/103 X |
| 6,640,244 | B1 | * | 10/2003 | Bowman-Amuah ......... 709/207 |
| 6,799,172 | B2 | * | 9/2004  | Candee et al. ................ 707/1 |
| 6,981,074 | B2 | * | 12/2005 | Oner et al. .................... 710/32 |
| 6,986,141 | B1 | * | 1/2006  | Diepstraten et al. ......... 718/108 |
| 7,249,369 | B2 | * | 7/2007  | Knouse et al. ................. 726/1 |
| 7,302,683 | B2 | * | 11/2007 | Ogilvy .......................... 718/1 |
| 7,434,223 | B2 | * | 10/2008 | Diepstraten et al. ......... 718/108 |

OTHER PUBLICATIONS

Watanabe, Computational Intelligence & Multimedia Applns. Proc., Sep. 23, 1999, pp. 10-13, Agent-oriented model for managing . . . .
Knuth, The Art of Computer Programming, vol. 3: Sorting and Searching, 1973, pp. 556-558, XP002295294.
Anonymous, IBM Technical Disclosure Bulletin, vol. 17, No. 11, pp. 3234-3237, Apr. 1, 1975, Program Event Signaling, XP002295267.

* cited by examiner

*Primary Examiner*—Meng-Ai An
*Assistant Examiner*—Tammy Lee
(74) *Attorney, Agent, or Firm*—Jacobson Holman PLLC

(57) ABSTRACT

A data processing system (1) is programmed with objects (2) according to the object-oriented architecture. Each object (2) is for implementing an event, which for financial securities processing is often referred to as a corporate action. An object (2) has a container (3) containing a series of masks (4), all at the same level in a flat structure. Each mask has four binary bit flags, each switching on or off a pre-stored unit (5) of executable code for an asynchronous transaction. Initialization or modifications of the system involves only processing through a series of decisions and setting mask flags accordingly.

8 Claims, 3 Drawing Sheets

DATA PROCESSING SYSTEM TO INITIALIZE OR MODIFY THE SYSTEM TO PERFORM TRANSACTIONS USING MASK COMPRISES ON/OFF FLAGS

This is a continuation of PCT/IE03/000105 filed Jul. 23, 2003 and published in English.

FIELD OF THE INVENTION

The invention relates to data processing systems, and more particularly to initialisation and/or modification of a system to perform transactions.

PRIOR ART DISCUSSION

Many data processing systems which perform transactions require a large manpower input for initial programming and subsequent maintenance/upgrade. This is because of the highly complex nature of business requirements. For example, in the field of securities processing a system may handle many different financial products, and for each product there are many functions to implement events (or "corporate actions") each comprising a number of transactions. As customer and financial needs and processes change and as regulations change, the corporate actions or events must be often modified and tested. Also, such complexity can lead to poor system performance for real time transaction processing because of the number of interactions between database and memory tables and retrieval of multiple program functions.

As functions are typically programmed individually, albeit with some re-use of code, the initialisation and ongoing modification is often very time-consuming and expensive.

The invention addresses these problems.

SUMMARY OF THE INVENTION

According to the invention, there is provided a data processing system comprising a processor, a memory, an input interface, and an output interface, the processor being programmed to perform data processing operations to complete an event, wherein an event is represented as an object comprising a mask switching on or off one or more of a number of units of executable code in which each unit is for implementing a transaction.

In one embodiment, there is a pre-defined and fixed number of units of code.

In another embodiment, the mask comprises a series of flags, each flag position being associated with a unit, and each flag value setting an on or off switch value for an associated unit of executable code.

In a further embodiment, the object comprises a plurality of masks, each associated with a subsidiary event within the event, each subsidiary event comprising one or more transactions.

In one embodiment, the masks are stored in at least one word having a plurality of masks, each mask having a plurality of flags.

In another embodiment, a flag is a binary bit.

In a further embodiment, a word is a 64-bit long.

In one embodiment, the object stores a numerical value representing the bits of each word.

In another embodiment, the word comprises binary bits and the numerical value is a decimal value.

In a further embodiment, the masks are in a linear series flat logical structure, the processor being programmed to execute the units of the masks in sequence.

In one embodiment, the object contains an array comprising a plurality of indexes, each index addressing a word comprising a plurality of masks.

In another embodiment, at least some of the transactions are asynchronous, without a return direction acknowledgement.

In a further embodiment the method comprises the steps of deciding in sequence if each of a limited number of pre-stored units of executable code are required for an event, and setting a switch value in a mask for the event accordingly.

In one embodiment, the switch values are set as attributes of an object representing the event.

In another embodiment, the flags are set with a fixed offset in a word for each unit decision.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
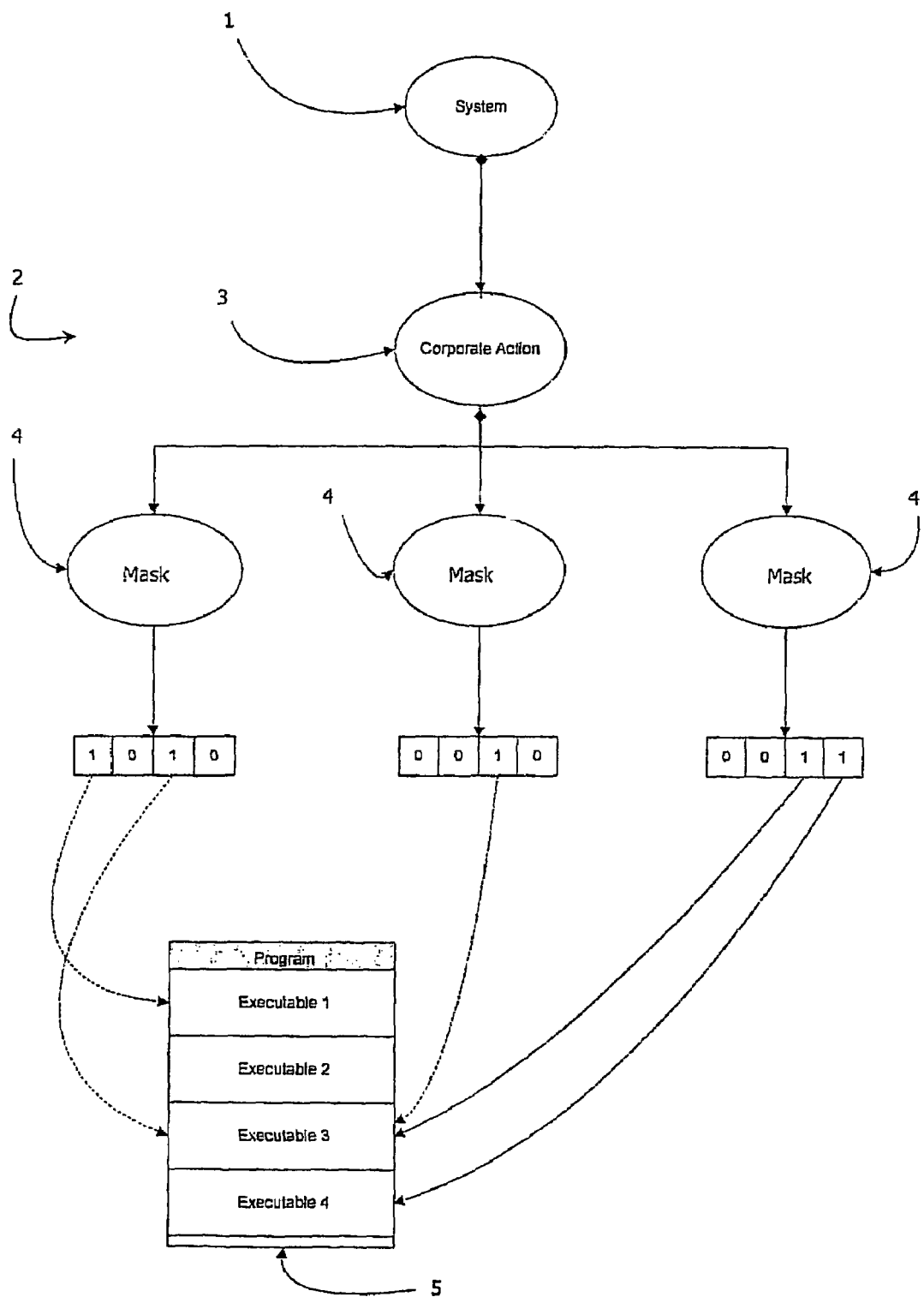
FIG. 1 is a diagram illustrating a processing structure for a data processing system of the invention.

Referring to FIG. 1 a data processing system 1 is for executing operations for a financial institution. The business aspects of the operations may, however, be of any type and the invention is concerned instead with the underlying technical features for system performance, ease of initialisation, and ease of maintenance/upgrade.

The system 1 comprises a number of objects 2, only one of which is shown. Each object 2 is responsible for performing a business event comprising multiple transactions. Each object 2 comprises:
- a container 3,
- a series of (in this case three) masks 4 contained within the container 3.

Each mask 4 comprises four ON/OFF flags, each flag switching on or off an associated unit of executable code 5. The units 5 of executable code are fixed and are separately stored, being addressed by the object 2.

If an object 2 has only one mask 4, the complete event is implemented by executing some or all of the four units 5, each unit 5 implementing a transaction. The maximum capacity of an object 2 is 16 masks, and so up to 64 transactions may be used to implement the event.

In this embodiment an event is called a "corporate action", being the term used for an event for a securities system. Such an event may, for example, by splitting of a shareholder's set of shares.

An important aspect is that there is only a limited number of executable units 5, in this embodiment four. These four units have code to implement the following transactions, expressed at the business level.
(i) Keep Existing Securities Yes/No—does the customer keep their existing shares as a result of this corporate action? If No then these securities are transferred out of the account.
(ii) Receive New Securities Yes/No—does the customer receive new securities as a result of this corporate action? If Yes then the new securities are transferred into the account.

(iii) Receive Cash Yes/No—does the customer receive cash as a result of this corporate action? If Yes then a cash amount is transferred into the account.

(iv) Pay Cash Yes/No—does the customer have to pay cash as a result of this corporate action? If Yes then a cash amount is transferred out of the account.

In this embodiment, each transaction is a single-direction asynchronous transfer, without an acknowledgement. It has been found that such a requirement for the transactions provides for efficient system operation and for effective breakdown of events.

Of course, the operations or transactions may be of any type other than the above, depending on the nature of the business. An advantageous aspect is that there is a limited and fixed number defined for the event.

In each mask 4 a "1" bit flag indicates that the associated unit 5 is to be used, and a bit "0" flag indicates that it is not to be used. Each executable unit 5 implements a transaction arising from a rule such as the rules (i) to (iv) set out above. There is therefore no need for inter-table fetches and so database access is kept to a minimum.

In practice, an object may have many masks 4. Thus, the masks 4 are stored in one or more longs, each of 64 bits, each long containing sixteen masks. Where there are more than sixteen masks there are two or more longs.

The structure is not logically hierarchical. The container 3 contains a number of masks, all masks being at the same level, in a "flat" logical architecture. The system processor executes the units 5 of the masks in succession, treating all of the masks and associated transactions as being at the same level.

Figure 2:
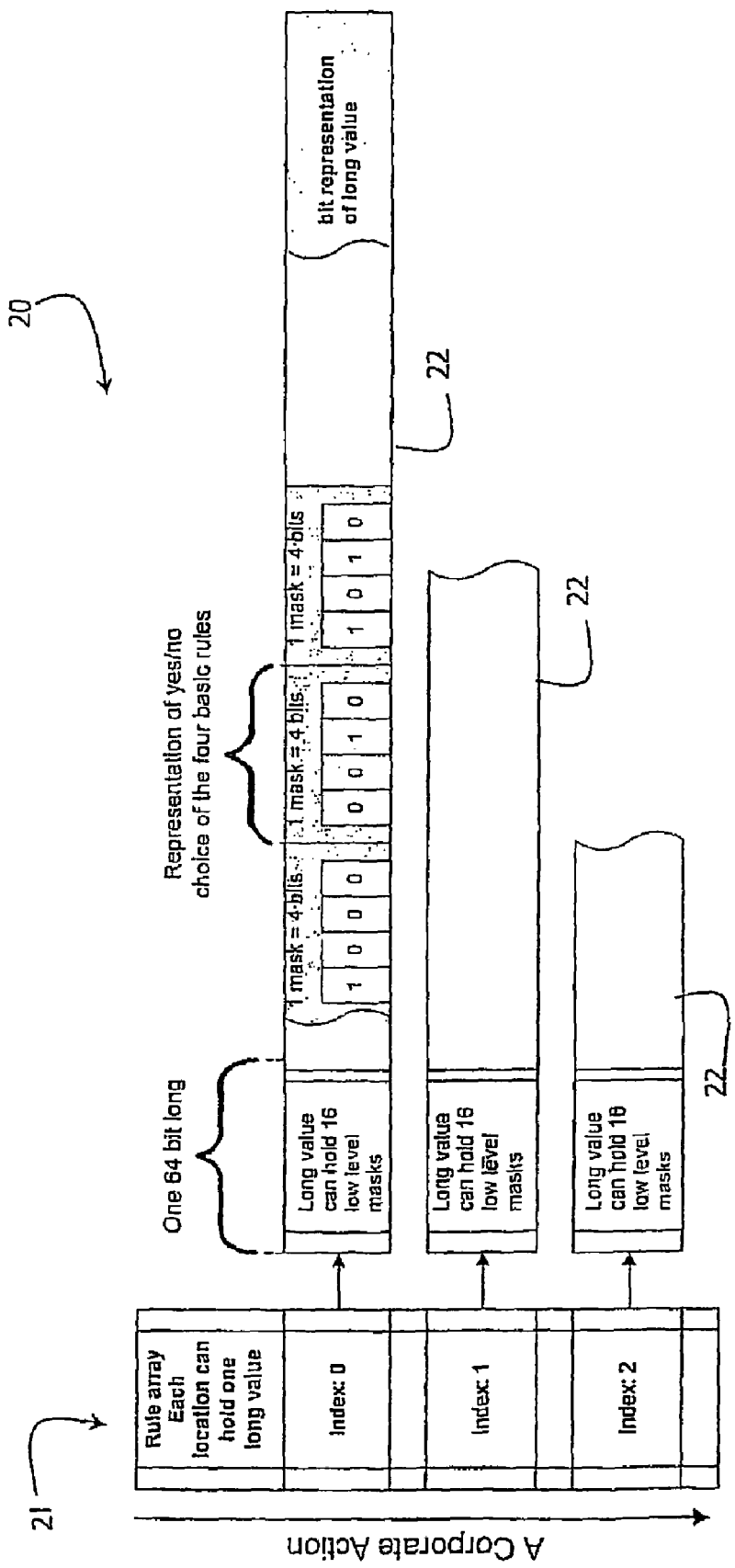
FIG. 2 is a more detailed diagram illustrating a rule array.

The longs are stored in a "rulearray" 20 comprising, as shown in FIG. 2:

an index 21 being the position of the long in the rulearray,
a decimal value 22 being the value of the long at that position, and each long is represented at the binary level by 64 bits.

The binary representations of the decimal value is the series of bits making up the long. This manner of storing the masks is very efficient and simple—additional transactions being achieved by simply adding to the longs.

Figure 3:
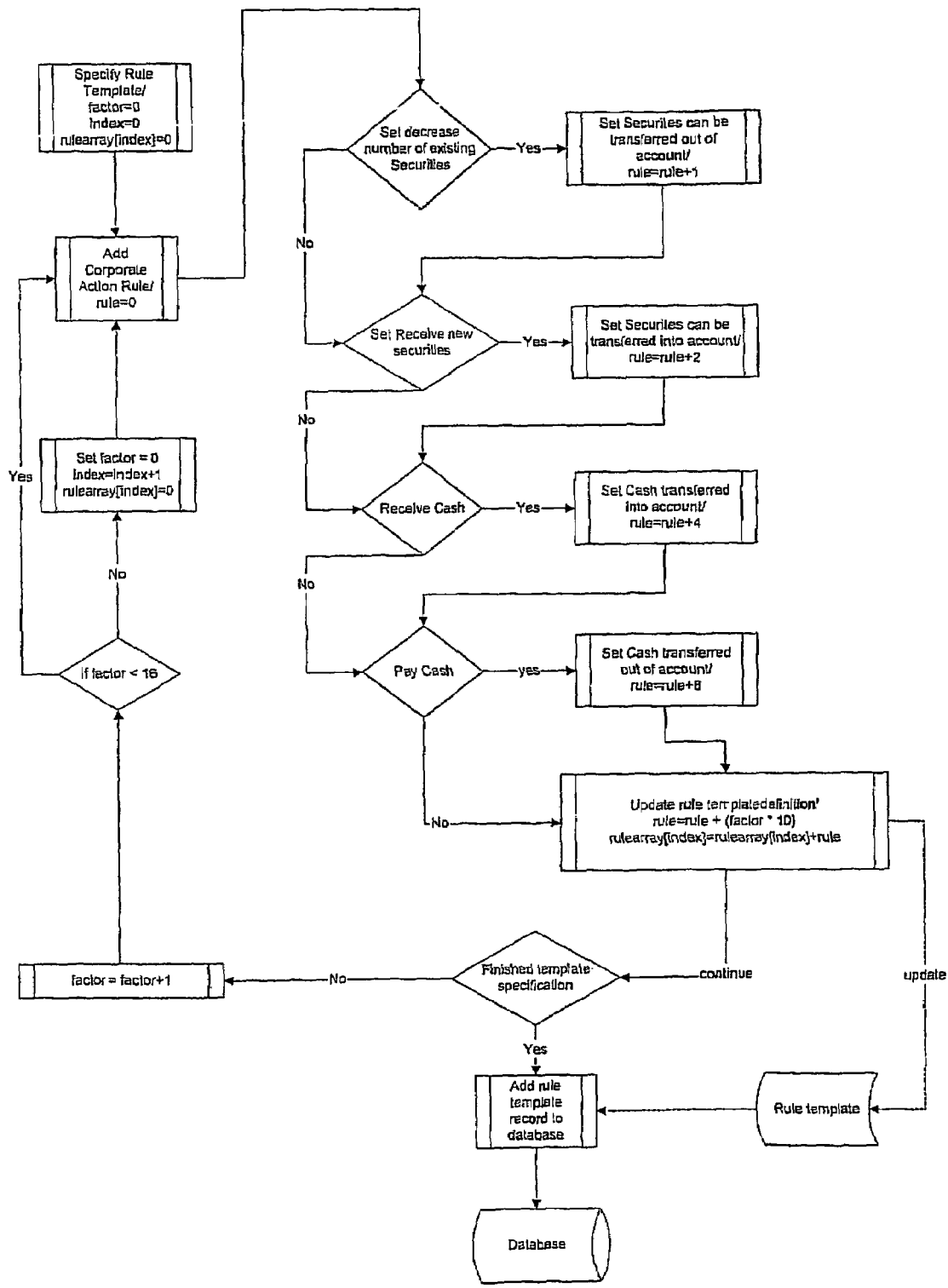
FIG. 3 is a flow diagram illustrating system initialisation.

Referring to FIG. 3, initialisation of an object for a corporate action is shown. In this diagram the series of four decision steps on the right hand side sets the mask for each action, the commands:

rule=rule+1, 2, 4, 8 inserting the bit in the mask at the correct position. In this diagram the first position is the LSB, and so on.

When a mask is defined the long is updated to include the new mask. The "factor" sets the position in the long. For example, the third position is indicated by factor value 2. The command:

rule=rule+(factor*10)

in which (factor*10), shifts the mask value to the correct position in the long. For example, for the third position in a long there is a factor value of 2 and (factor*10) adds all preceding values to the mask value to inherently define the position.

In FIG. 3 the parameter "index" means the number of the long, the index being 0 for the first long.

The rulearray is built up in iterations as shown in FIG. 3. Once set up it does not change until off-line modification is made by executing the method of FIG. 3.

This is a major advance for system initialisation and ongoing modification/upgrade, as it significantly minimises system architecture complexity and engineering manpower. All that is required for a new upgrade is to execute the process of FIG. 3 to create a new object. Modification of an existing object is achieved by simply deleting the existing one and generating a fresh one using the method of FIG. 3 and generating a fresh one according to the process of FIG. 3. Also, system performance is excellent even for complex events because of the "flat" series mask sequence. This avoids iterative loops between different code hierarchical levels as has happened in the prior art. Another advantage arising from the structure of the objects 2 is that overall system architecture is easy for systems analysts to visualise and understand.

It will be appreciated that the invention allows a system to have a simple structure even if the operations to be performed are complex. Re-configuration is easily achieved by simply re-executing the setup process of FIG. 3.

The invention is not limited to the embodiments described but may be varied in construction and detail. For example, the events implemented by the objects may be other than those referred to as "corporate actions". Also, the masks may have flags other than binary bits, although binary representation is an efficient one.

The invention claimed is:

1. A data processing system for performing data processing operation on events, wherein each of the events comprising a plurality of transactions each arising from a rule, wherein the data processing system comprising:

a processor coupled to a memory, an input interface, and an output interface;
the processor being programmed to perform the data processing operations on said each of the events;
wherein said each of the events is represented in the processor as an object stored in the memory, where each of said object responsible for performing an event, and each said object comprises a container containing a series of at least one mask;
wherein each said mask comprises ON/OFF flags, each flag switching on or off one or more associated units of executable code; and wherein each said unit of executable code is for implementing a transaction;
said units of executable code:
being fixed,
being stored separately from the object,
being addressed by the object, and
for implementing one of said transactions;
wherein the masks are stored in at least one word having a plurality of masks;
wherein each said object stores a numerical value representing the bits of each word, and each word comprises binary bits and the numerical value is a decimal value;
wherein the masks are in a linear series flat logical structure, the processor being programmed to execute the executable code units of the masks in sequence based on value of the ON/OFF flags; and
at least some of the transactions are asynchronous, without a return direction acknowledgement.

2. The data processing system as claimed in claim 1, wherein
a flag is a binary bit.

3. The data processing system as claimed in claim 1, wherein:
a word is a 64-bit long.

4. The data processing system as claimed in claim 1, wherein:
each object contains an array comprising a plurality of indexes, and each index addresses a word comprising a plurality of masks.

5. An initialization method for a data processing system for performing data processing operation on events, wherein each of the events comprising a plurality of transactions each arising from a rule, wherein the data processing system comprising:

a processor coupled to a memory, an input interface, and an output interface;

the processor being programmed to perform the data processing operations on said each of the events;

wherein said each of the events is represented in the processor as an object stored in the memory, where each of said object responsible for performing an event, and each said object comprises a container containing a series of at least one mask;

wherein each said mask comprises ON/OFF flags, each flag switching on or off one or more associated units of executable code; and wherein each said unit of executable code is for implementing a transaction;

said units of executable code:

being fixed, being stored separately from the object, being addressed by the object, and for implementing one of said transactions;

wherein the masks are stored in at least one word having a plurality of masks;

wherein each said object stores a numerical value representing the bits of each word, and each word comprises binary bits and the numerical value is a decimal value;

wherein the masks are in a linear series flat logical structure, the processor being programmed to execute the executable code units of the masks in sequence based on value of the ON/OFF flags; and at least some of the transactions are asynchronous, without a return direction acknowledgement, the method comprising the steps of:

deciding in sequence if each of a limited number of pre-stored units of executable code are required for an event, and setting a switch value in a mask for the event accordingly.

6. The initialization method as claimed in claim 5, wherein the switch values are set as attributes of an object representing the event.

7. The initialization method as claimed in claim 5, wherein: the switch values are set as attributes of an object representing the event, and the flags are set with a fixed offset in a word for each unit decision.

8. A computer program product comprising a computer-readable storage medium having computer-executable software code when executed on a processor for performing an initialization method for a data processing system for performing data processing operation on events, wherein each of the events comprising a plurality of transactions each arising from a rule, wherein the data processing system comprising:

a processor coupled to a memory, an input interface, and an output interface;

the processor being programmed to perform the data processing operations on said each of the events;

wherein said each of the events is represented in the processor as an object stored in the memory, where each of said object responsible for performing an event, and each said object comprises a container containing a series of at least one mask;

wherein each said mask comprises ON/OFF flags, each flag switching on or off one or more associated units of executable code; and wherein each said unit of executable code is for implementing a transaction;

said units of executable code:

being fixed, being stored separately from the object, being addressed by the object, and for implementing one of said transactions;

wherein the masks are stored in at least one word having a plurality of masks;

wherein each said object stores a numerical value representing the bits of each word, and each word comprises binary bits and the numerical value is a decimal value;

wherein the masks are in a linear series flat logical structure, the processor being programmed to execute the executable code units of the masks in sequence based on value of the ON/OFF flags; and at least some of the transactions are asynchronous, without a return direction acknowledgement, the method comprising the steps of: deciding in sequence if each of a limited number of pre-stored units of executable code are required for an event, and setting a switch value in a mask for the event accordingly.

* * * * *